United States Patent [19]

Martin

[11] 4,102,712
[45] Jul. 25, 1978

[54] HEADLAMP TILTING MECHANISM IN A MOTOR VEHICLE

[75] Inventor: Frederick Raymond Patrick Martin, Bromley, England

[73] Assignee: C.I. Hayes Inc., Cranston, R.I.

[21] Appl. No.: 562,117

[22] Filed: Mar. 26, 1975

[30] Foreign Application Priority Data

Mar. 30, 1974 [GB] United Kingdom ............... 14210/74

[51] Int. Cl.² ............................................. B60Q 1/10
[52] U.S. Cl. ...................................... 362/71; 362/385
[58] Field of Search ............... 240/7.1 LJ, 61.1, 61.5, 240/62.3, 61.6, 61.8; 362/71, 385

[56] References Cited

U.S. PATENT DOCUMENTS

| 1,491,336 | 4/1924 | Conners | 240/61.5 |
| 1,724,121 | 8/1929 | Barnfather | 240/61.5 |
| 3,316,397 | 4/1967 | Yssel | 240/62.3 |
| 3,370,162 | 2/1968 | Biabaud | 240/62.3 |
| 3,643,082 | 2/1972 | Fleury | 240/7.1 LJ |
| 3,868,500 | 2/1975 | Martin | 240/7.1 LJ |

Primary Examiner—L. T. Hix
Assistant Examiner—Alan Mathews
Attorney, Agent, or Firm—Salter & Michaelson

[57] ABSTRACT

The headlamp tilting mechanism is provided in a motor vehicle in which a pair of headlamps are tiltable relative to the motor vehicle body. The headlamp tilting mechanism includes a hydro-mechanical transducer which is fed with hydraulic signals corresponding to changes in the attitude of the vehicle body under changing load and acceleration and braking forces. The transducer has an output rod slidable in bushes relative to the body and is connected with a lever which extends substantially parallel to the rod by means of a link which is pivoted at its ends to the lever and rod respectively. One end of the lever is pivoted to the body while the other end is connected through the intermediary of a further link with the respective headlamp. The arrangement described above permits ready tilting movement of the headlamp upon sliding movement of the output rod but does not permit sliding movement of the rod as a result of external pressures applied to the headlamp.

4 Claims, 1 Drawing Figure

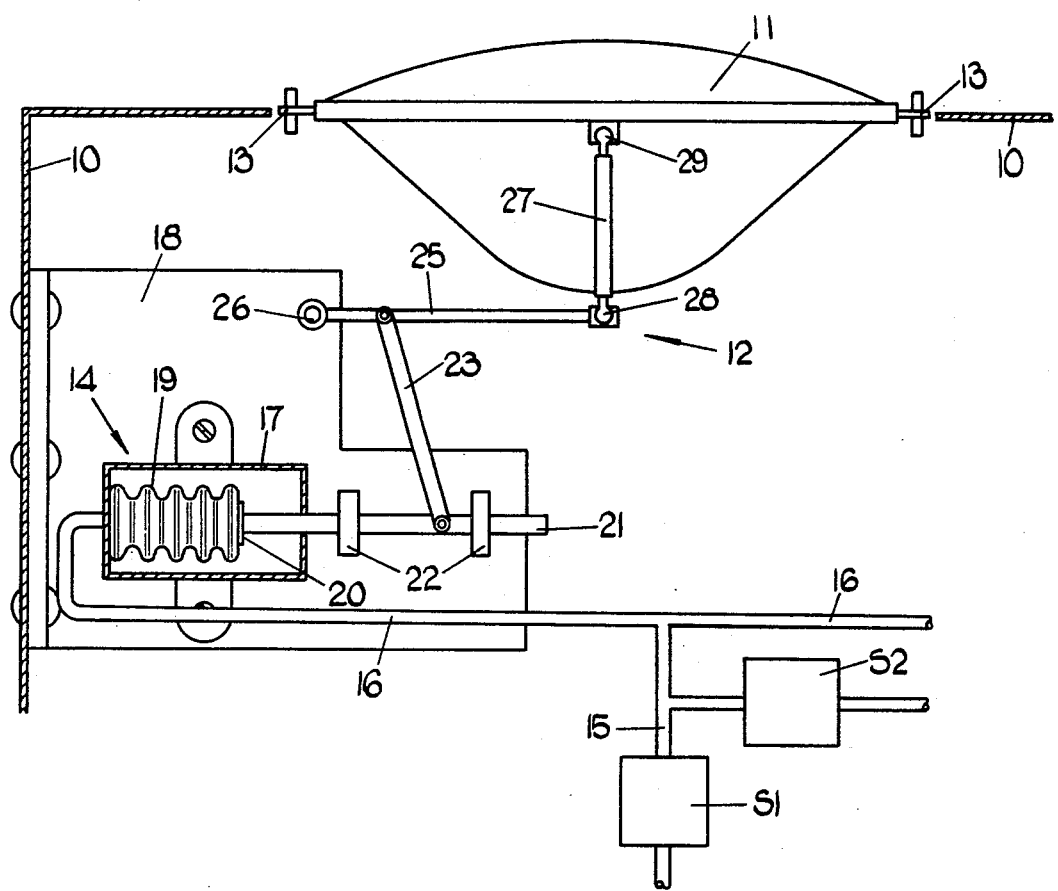

HEADLAMP TILTING MECHANISM IN A MOTOR VEHICLE

FIELD OF THE INVENTION

This invention relates to a headlamp tilting mechanism in a motor vehicle and is more particularly, though not exclusively, concerned with a headlamp tilting mechanism which effects tilting of the headlamps in accordance with changes in the attitude of the body of the vehicle relative to wheels thereof so as to maintain light beams projected from the headlamps, in use, at the desired level.

BACKGROUND OF THE INVENTION

It is a disadvantage of some previously proposed lamp tilting mechanism, particularly those including hydraulic linkages, and the headlamps can be tilted, because of the inherent resilience of the hydraulic part of the mechanism, by wind pressures acting on the front of the vehicle.

It is an object of the present invention to obviate or mitigate the above disadvantage.

SUMMARY OF THE INVENTION

According to the present invention, there is provided in a motor vehicle comprising a body, and a headlamp mounted for tilting movement relative to the body, a mechanism for tilting the headlamp, said mechanism including an axially slidable drive member, a lever pivotally mounted relative to the body and connected with the headlamp, the lever extending generally parallel to the drive member, and a link extending transversely between and being pivotally connected to the lever and to the drive member, whereby the arrangement of lever and drive member readily permits movement of the lever by the drive member but opposes movement of the drive member by the lever.

Preferably, the lever is connected with the headlamp through the intermediary of a further link which is pivotally attached at one of its ends to the headlamp and at the other of its ends to the lever.

Conveniently, the link which interconnects the lever and the drive member is pivotally attached to the lever at a point intermediate the attachments of the lever to the body and to the further link leading to the headlamp.

The drive member may be in the form of an output rod of a hydraulic transducer.

DESCRIPTION OF THE FIGURE OF THE DRAWING

An embodiment of the present invention will now be described by way of example, with reference to the accompanying drawing which is a schematic plan view of part of a headlamp tilting mechanism according to the present invention in a motor vehicle.

Referring to the drawing, the motor vehicle comprises a body 10, a pair of headlamps 11 (only one shown) mounted on the body 10, and has mounted therein a headlamp tilting mechanism 12 (only partly shown) for effecting movement of the headlamps 11 in accordance with changes in the attitude of the vehicle body 10 relative to wheels (not shown) of the vehicle. Each headlamp 11 is mounted on the body 10 for tilting movement in a vertical plane about a horizontal pivot 13. Each pivot 13 is connected with a lower portion of the respective headlamp 11. The headlamp tilting mechanism 12 includes a sensor S1 which produces a hydraulic signal whose value depends upon the attitude of the vehicle body 10 relative to rear wheels of the vehicle, and a sensor S2 which is connected with an engine (not shown) of the vehicle and serves to provide a signal which corresponds to changes in the attitude of the vehicle body relative to the wheels as a result of acceleration and braking forces thereon, the signal being derived as a result of longitudinal movement of the engine relative to the body 10 under the effect of the acceleration and deceleration forces thereon. The sensors S1 and S2 are connected with a pair of hydraulic transducers 14 (only one shown) via a main conduit 15 and a pair of branch conduits 16 connected with the main conduit 15 and leading to the respective transducers 14. Since the sensors S1 and S2 form no part of the present invention, they will be described in no further detail in this specification except to say that they produce a signal in conduits 15 and 16 which changes in response to changes in the attitude of the vehicle body relative to the wheels thereof under acceleration and braking conditions as well as under changing conditions in the load carried at the rear of the vehicle body. Hereafter, the operation of the headlamp tilting mechanism 12 will be described in relation to the part thereof illustrated, i.e. the part of the mechanism 12 for effecting tilting movement of the left hand headlamp 11 as viewed from a driving seat of the vehicle. The transducer 14 comprises a body 17 which is secured to a plate 18 fixed to the body 10. Within the body 17, there is provided a bellows element 19 whose interior is in communication with branch conduit 16. The bellows element 19 has a movable end 20 to which is secured one end of an axially slidable output rod 21 projecting from the body 17 and slidably engaging a pair of spaced bushes 22 on the plate 18. Intermediate its ends and between the bushes 22, the output rod 21 has pivotally secured thereto one end of a link 23 whose other end is pivotally attached to an intermediate portion of a lever 25. One end of the lever 25 is mounted on the plate 18 through the intermediary of a vertical pivot 26 whilst its other end is attached to one end of a further link 27 through the intermediary of a ball and socket joint 28. The other end of the further link 27 is attached to an upper portion of headlamp 11 through the intermediary of a further ball and socket joint 29. The lever 25 extends generally parallel to output rod 21.

OPERATION

In use, if a load on the rear of the vehicle body 10 is increased, a reduced pressure appears in conduits 15 and 16 as a result of sensor S1 and the bellows element 19 is caused to contract as a result of the reduced pressure. This draws output rod 21 to the left as viewed in the drawing to cause lever 25 to pivot in an anti-clockwise direction about pivot 26 because of the interconnection of rod 21 and lever 25 by link 23. Such anti-clockwise movement of lever 25 causes a corresponding movement of further link 27 as viewed in the drawing to effect tilting movement of the headlamp 11 about pivots 13 by an amount which compensates for the increased loading of the rear of the vehicle body 10. Similarly, when the vehicle is subjected to acceleration forces, the sensor S2 causes a decrease in pressure in conduits 15 and 16 and a corresponding downward tilting of the headlamps 11 as described above. The reverse operation occurs if the load on the vehicle body 10 is lightened or if the vehicle is subjected to braking forces. In such an event, an increase in pressure occurs in conduits 15 and 16, the bellows element 19 is expanded and moves output rod 21 to the right as viewed in the drawing. This causes lever 25 to be pivotted in a clockwise direction about pivot 26 and effects downward movement of link 27 as viewed in the drawing to effect corresponding tilting of the headlamp 11.

If it were not for the arrangement of lever 25, link 23 and rod 21, wind pressure acting on each headlamp 11 would cause it to be tilted upwardly because of the positioning of its respective pivots 13 and because of the resilience which is built into the hydraulic part of the headlamp tilting mechanism 12. However, it will be appreciated that, because (i) the lever 25 is generally parallel to the axis of the rod 21, (ii) the lever 25 is constrained to pivot transversely with respect to the direction of movement of the rod 21, and (iii) the link 23 extends substantially perpendicularly to the rod 21 and lever 25, very great forces would be required in order to effect sliding movement of rod 21 by pivotal movement of the lever 25. Thus, the headlamps 11 are effectively locked against movement by external pressures, such as wind pressure, in use.

I claim:

1. In a motor vehicle comprising a body and a headlamp mounted for tilting movement relative to said body, a mechanism for tilting said headlamp, said mechanism including an axially slidable drive member including means restraining the drive member to axial movement, a lever pivotally mounted relative to said body for pivotal movement transversely with respect to the direction of axial movement of said drive member and connected with said headlamp, said lever extending generally parallel to said drive member, and a single link extending transversely between and being pivotally connected to said lever and to said drive member, the arrangement of said lever, said single link, and said drive member causing movement of said lever through axial displacement of said drive member and said drive member opposes movement of said link and lever due to external forces imposed on said headlamp and transmitted through said lever and link to said drive member.

2. The mechanism according to claim 1, wherein said lever is connected with said headlamp through the intermediary of a further link which is pivotally attached at one of its ends to said headlamp and at the other of its ends to said lever.

3. The mechanism according to claim 2, wherein said link which interconnects said lever and said drive member is pivotally attached to said lever at a point intermediate the attachments of said lever to said body and to said further link leading to said headlamp.

4. The mechanism according to claim 1, wherein said drive member is in the form of an output rod of a hydraulic transducer.

* * * * *